May 3, 1960     F. D. JONAS ET AL     2,935,204

SUSPENSION FILING SYSTEM

Filed Aug. 22, 1956     12 Sheets-Sheet 1

INVENTORS
FRANK D. JONAS
EDWARD D. PATTERSON

BY Darby & Darby

ATTORNEYS

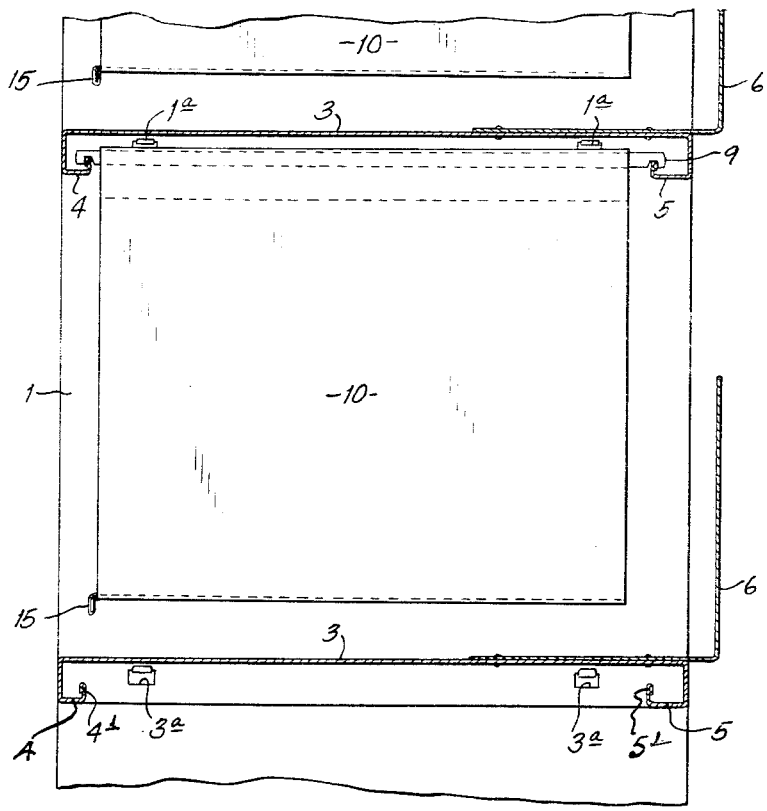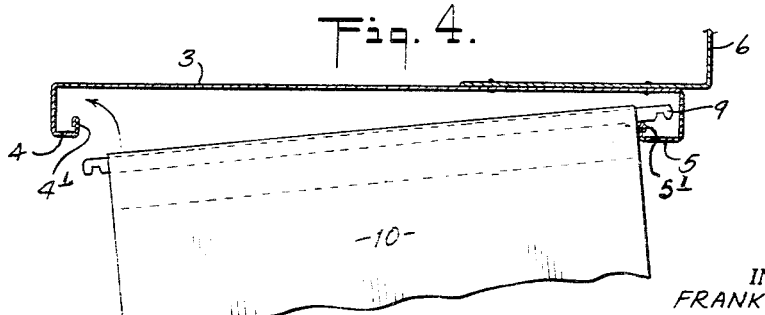

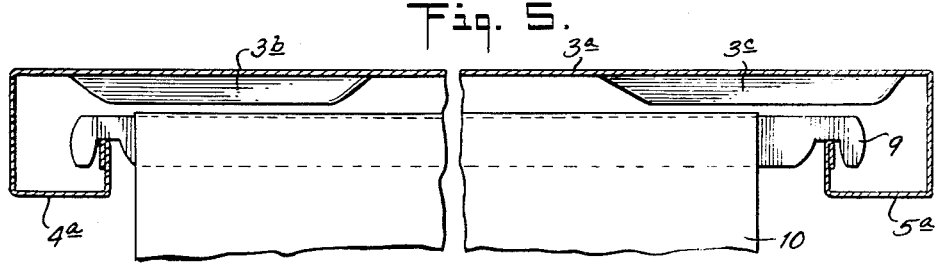
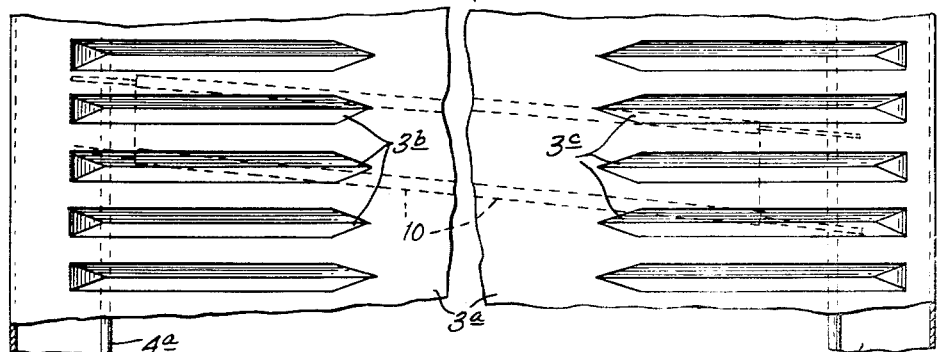
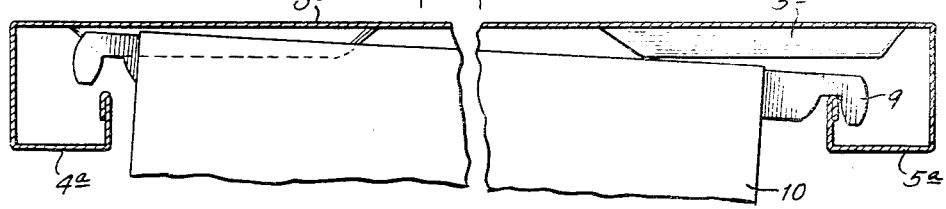
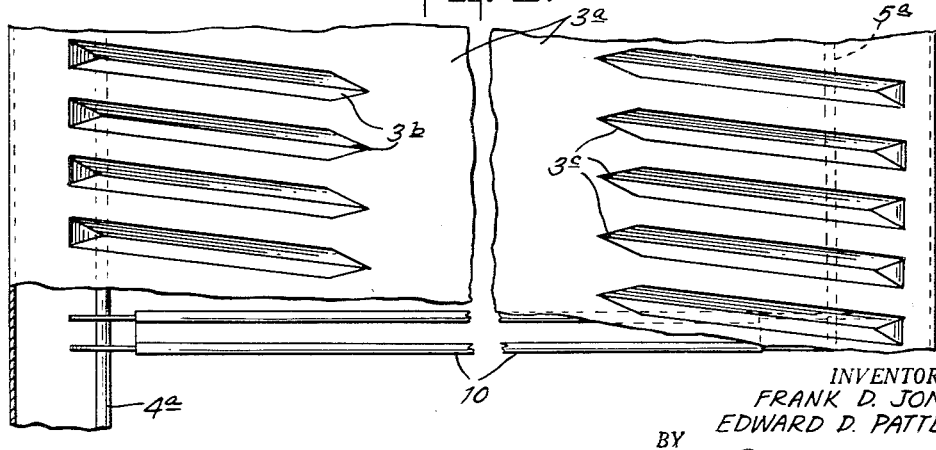

INVENTORS
FRANK D. JONAS
EDWARD D. PATTERSON
BY
ATTORNEYS

May 3, 1960 F. D. JONAS ET AL 2,935,204
SUSPENSION FILING SYSTEM
Filed Aug. 22, 1956 12 Sheets-Sheet 6

INVENTORS
FRANK D. JONAS
EDWARD D. PATTERSON
BY
ATTORNEYS

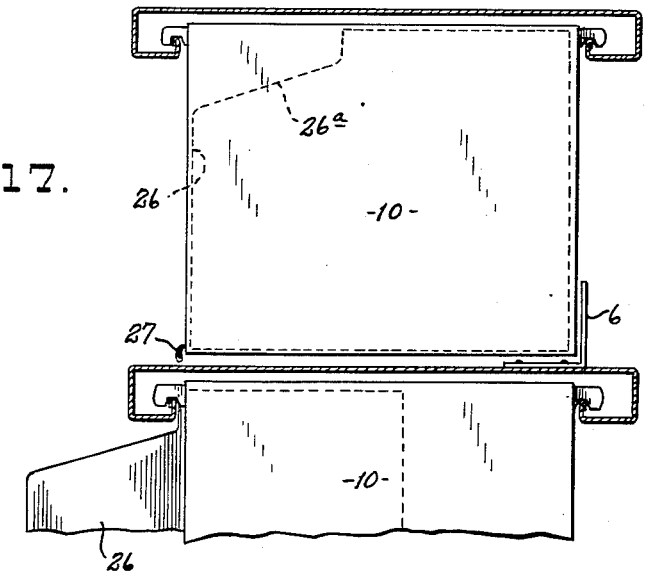
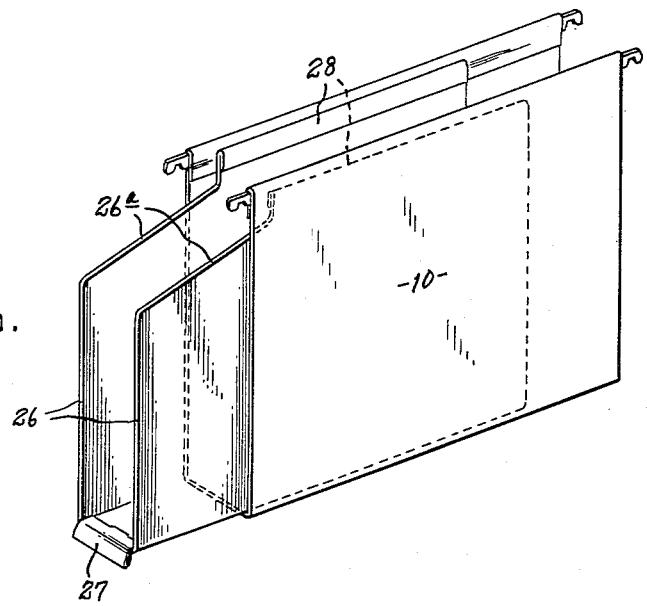

INVENTORS
FRANK D. JONAS
EDWARD D. PATTERSON
BY
ATTORNEYS

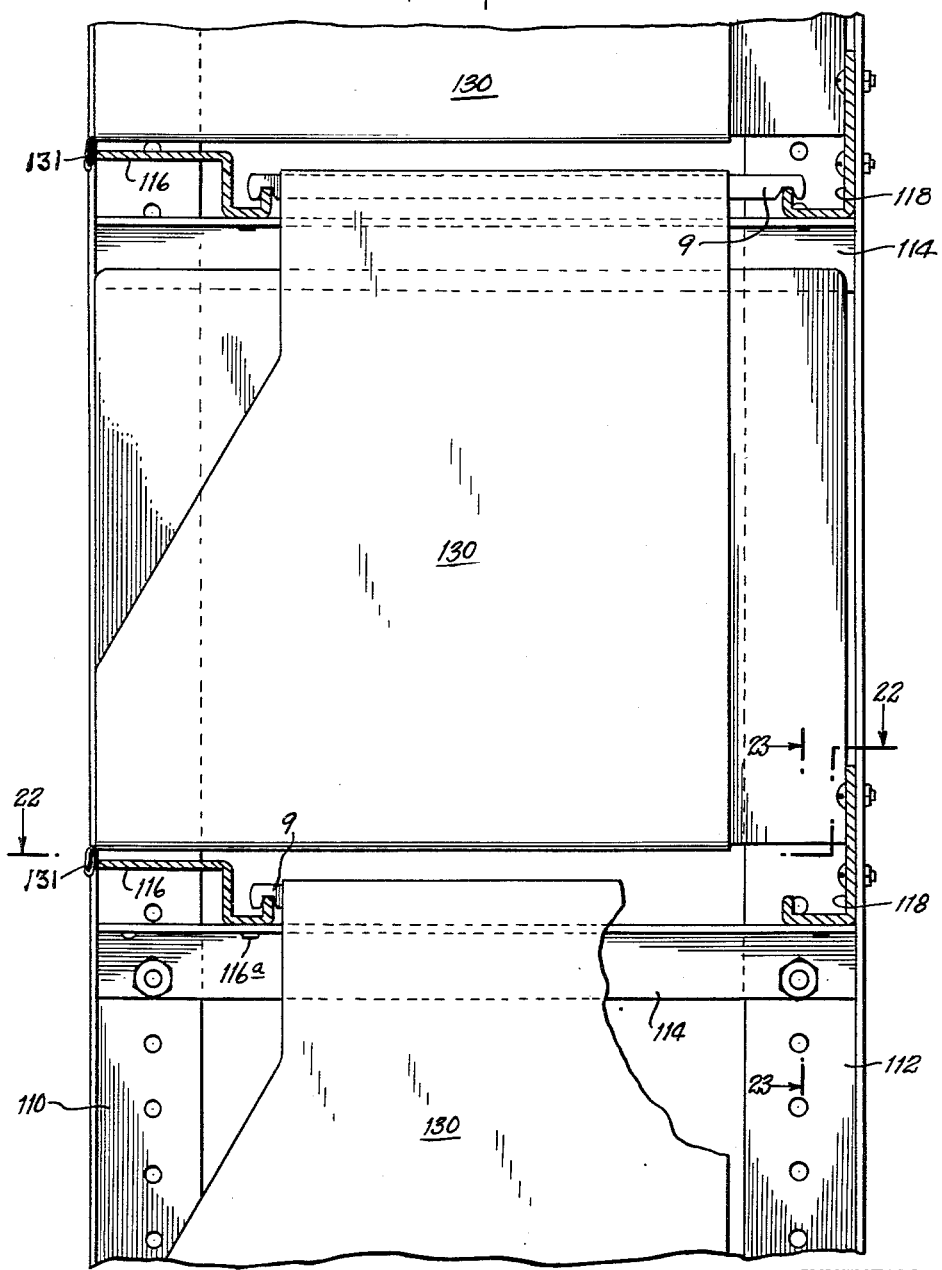

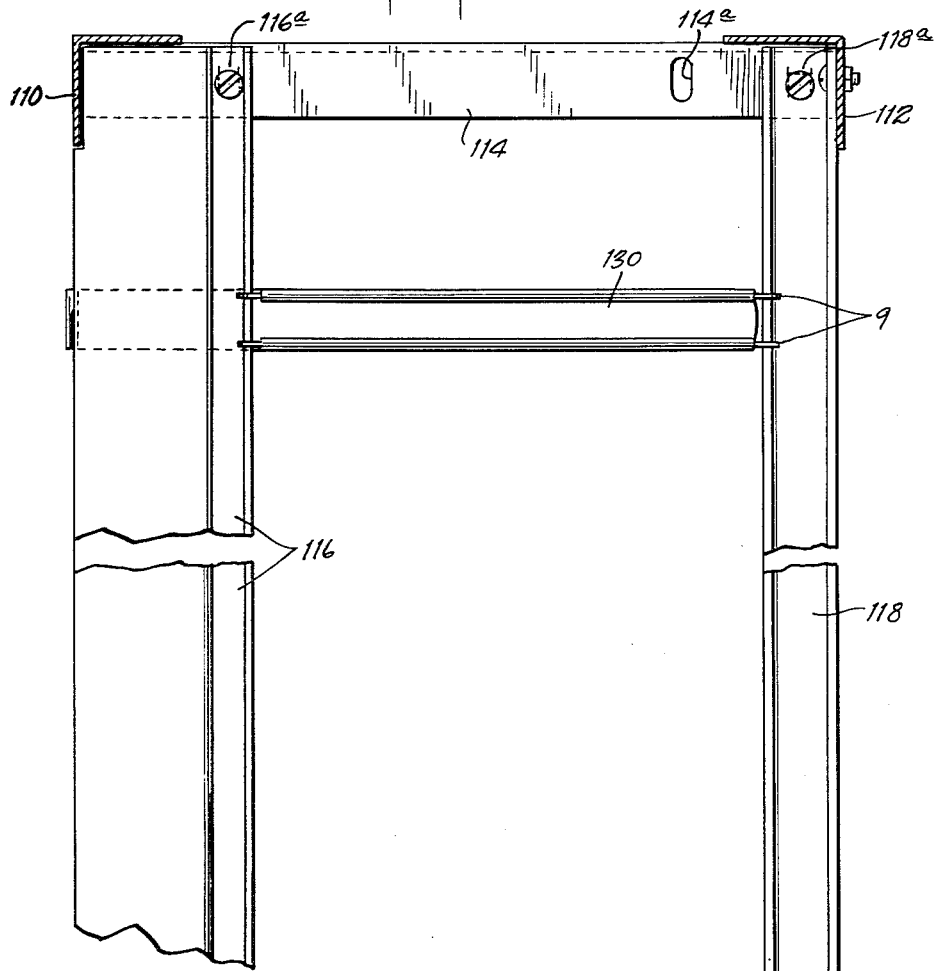

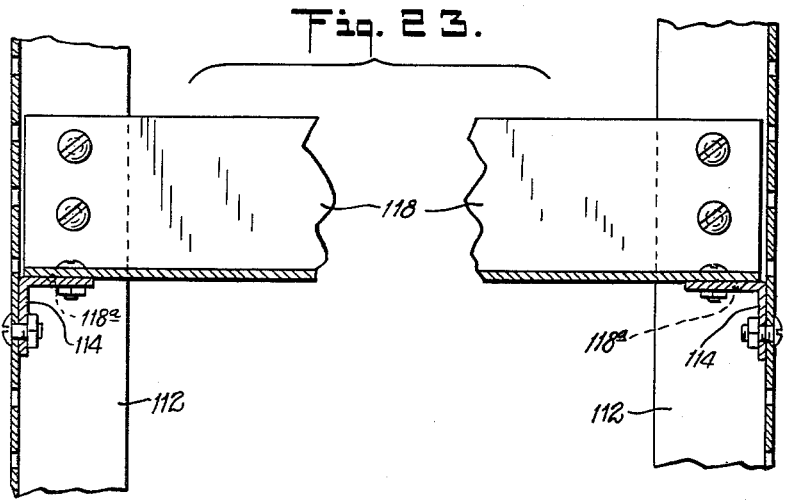
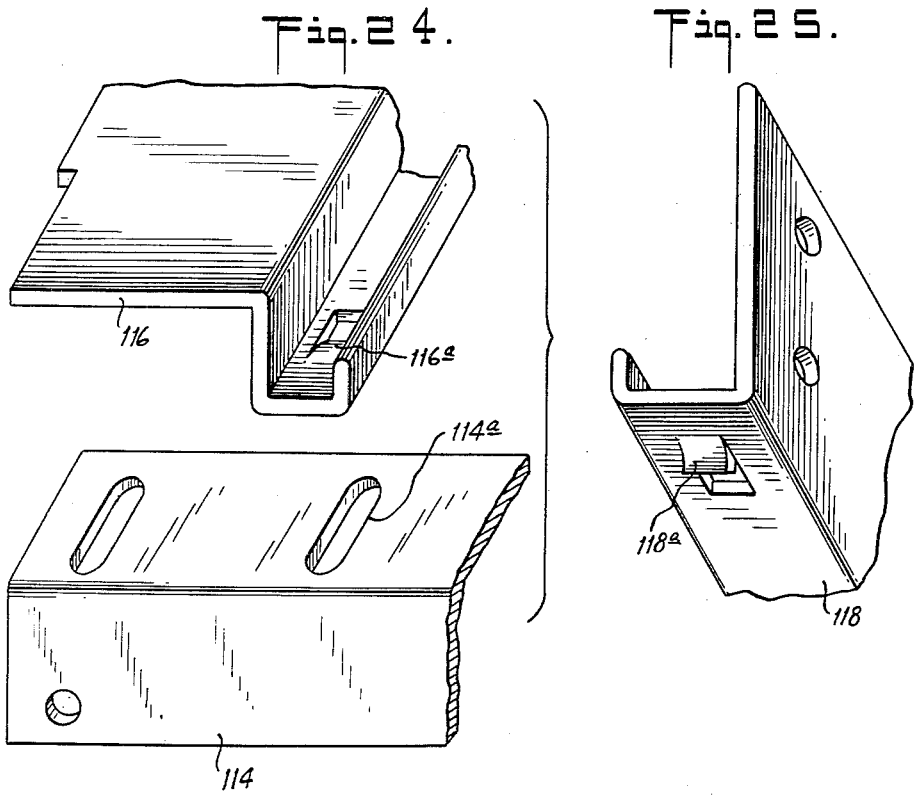

United States Patent Office 2,935,204
Patented May 3, 1960

2,935,204

SUSPENSION FILING SYSTEM

Frank D. Jonas, Upper Brookville, and Edward D. Patterson, Sea Cliff, N.Y., assignors, by mesne assignments, to Oxford Filing Supply Co. Inc., Garden City, N.Y., a corporation of New York Application August 22, 1956, Serial No. 605,653

16 Claims. (Cl. 211—46)

This invention relates to filing systems of the suspension type with special reference to large assemblies of hanging folders with improved structures for displaying and facilitating observation of associated identifying data.

A broad object of this invention is to provide rack assemblies for large numbers of suspension filing folders, which racks when necessary can be from floor to ceiling in height.

An object of the invention is to provide improved forms of rack assemblies adapted for use with hanging or suspension files.

Another object is to provide a structure which will prevent inadvertent displacement, as an incident to normal use, of the suspension files or one end thereof from the rails.

A further object of this invention is the arrangement and proportioning of constituent parts to facilitate the mounting and demounting of the files on and from the rails without visual observation thereof.

Another object of the invention is to provide identifying data tabs or receptacles associated with the suspension files to facilitate their inspection and reading either from a point at right angles to the plane of the racks or from a point in a plane parallel thereto.

Another object of the invention is to provide in hanging shelf suspension file assemblies of this type, structure which facilitates partial withdrawal of the suspension files, their contents, or both, to increase access to their identifying tabs and contents.

Other and more detailed objects of the invention will be apparent from the following disclosure of a further embodiment of the subject matter of this invention, all as illustrated in the accompanying drawings.

In the drawings,

Figure 3 is a cross-sectional view taken on the line 3—3 of Figure 1;

Figure 4 is a view from the same point as that of Figure 3 showing an intermediate step in mounting one of the suspension files on the rails;

Figure 5 is a transverse, vertical, cross-sectional view through one of the shelves of the rack, showing a series of ribs which prevent inadvertent displacement of the hanger rods of the suspension files from the rails;

Figure 6 is a top plan view of the structure of Figure 5, illustrating how the ribs prevent inadvertent displacement while permitting intentional removal;

Figure 7 is a view similar to Figure 5, indicating an intermediate step for intentional removal;

Figure 8 is a view similar to Figure 6, showing a modified arrangement of the ribs;

Figure 17 is a view similar to Figure 3 of a suspension system similar to that of Figure 3, but in which each suspension file is provided with a slidable liner which can be pulled forward to render the contents of the folder accessible, without moving the folder itself, if so desired;

Figure 18 is a perspective view of this folder and its slidable liner;

Figure 21 is a vertical, cross-sectional view through a modified form of suspension filing system in accordance with this invention in which the rails are not a part of a shelf;

Figure 22 is a cross-sectional view taken on the line 22—22 of Figure 21;

Figure 23 is a cross-sectional view taken on the line 23—23 of Figure 21;

Figures 24 and 25 are enlarged detail perspective views of structural details of this form of the invention.

Suspension filing systems are well known in the field of document filing. They are most widely used in file cabinets having movable drawers in which are mounted racks or rails on which the filing folders are suspended. Access is had by opening the individual drawers.

A more recent development for large installations of suspension files is to provide racks which are often from floor to ceiling in height, or at least to maximum reaching height. Theses racks, somewhat similar to the knockdown steel book racks for libraries, are provided with rails on which the suspension folders are supported. Without going into detail, in their present state of development, these rack suspension filing systems have many disadvantages, and it is the general purpose of this invention to adapt the broad idea of rack suspension files to more useful and convenient forms.

Figure 1:
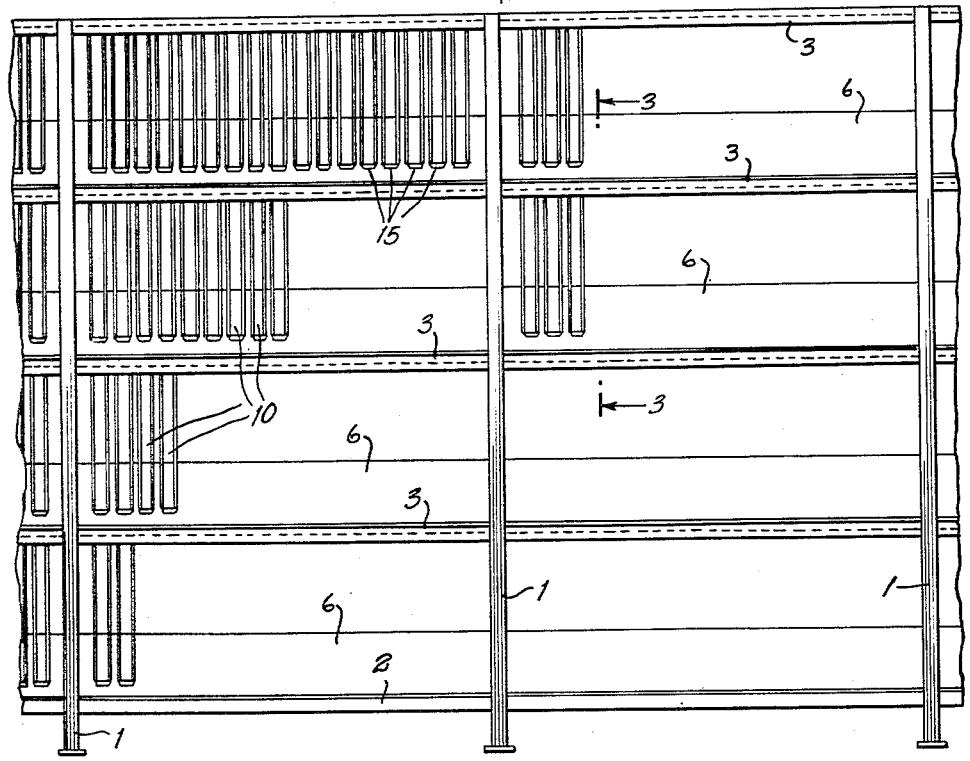
Figure 1 is a front elevational view of a portion of one form of a shelf type hanging filing system in accordance with this invention.

Referring to Figure 1 of the drawings, a section of such a rack, as adapted by this invention, is illustrated. It consists of a series of suitably spaced vertical partition walls and standards 1, which are interconnected with a series of removable shelves. The lowermost shelf 2 serves only as a bottom for the assembly wall, and the higher shelves 3 are adapted to provide rails for the suspension files. Economy may indicate that the bottom shelf 2 can be of the same construction as the higher shelves 3. However, the higher shelves 3 are provided with rails to support the files.

First it is noted, however, as clearly illustrated in

Figure 2:
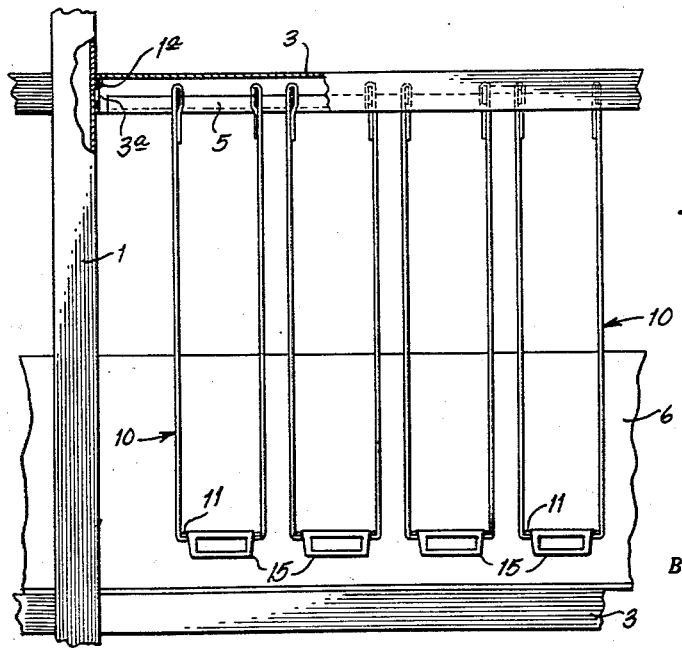
Figure 2 is an enlarged detail front elevational view of a small section of the structure of Figure 1, showing some parts in cross-section.

Figure 2, that the shelves 3 are in the form of inverted shallow metal pans having peripheral flanges around all sides. The end flanges of each shelf are provided with apertures, as shown in Figures 2 and 3 at 3ª. The partition walls 1 are provided with similarly positioned struck-out ears 1ª which fit into the apertures 3ª, detachably locking the shelves to the partition walls and forming in the aggregate a strong form-sustaining rack.

As is clear from these figures, the side wall flanges, of each of the shelves 3, are formed into troughs, the terminal innermost flanged edges thereof being doubled over on themselves to form thickened load bearing edge surfaces or rails, as is clear in Figure 3. Thus the side wall flange at the front of the shelf is provided with the integral trough 4 and the opposite flange with the integral trough 5, with thickened load bearing edges forming rails 4' and 5'. It will be noted, as is shown in Figure 3, that the transverse width of the trough 5 is greater than that of the trough 4, for a purpose to be described shortly. In the structure so far described it will be seen that attached on the top side of each shelf 3 is a right angled metal fixture 6, one leg of which, extending vertically, forms a back stop so that papers put in the filing folders cannot fall out at the rear end thereof.

At this point it may be noted that it is not necessary that the shelves 3 be imperforate or continuous, as they may be replaced by longitudinal members which could take various forms to provide a pair of spaced parallel rails, as will be described in detail below. In other words, the rails do not need to be connected by an imperforate wall, although as a practical matter this wall is desirable as it serves the purpose of shielding the contents of the files from dust collection.

The suspension files are indicated generally at 10 and are usually made of fiber board, cardboard, or paper of suitable quality and weight and are folded along a pair of medial lines, see Figure 2, to provide a flat bottomed pocket of the desired dimension. As is well known in this art the free edges of the side walls of the pocket are bent over upon themselves and secured together to form suitably dimensioned edge passages in which the suspension rods 9 are mounted. These rods usually take the form of thin metal strips which have bottom edge notches adjacent each end, see Figure 3, spaced so as to rest on the rails of the troughs 4 and 5 when in position. The imperforate shelf with the open top edges of the files lying in a plane above the rails greatly minimizes all entrance of dust from the top.

In this form of the invention each file folder is provided with a flat tubular data tab 15 having a data exposing aperture in the front wall. In this form these data tabs all lie in the plane of the front wall of the rack and may be read from a point in front of the rack.

Figure 12:
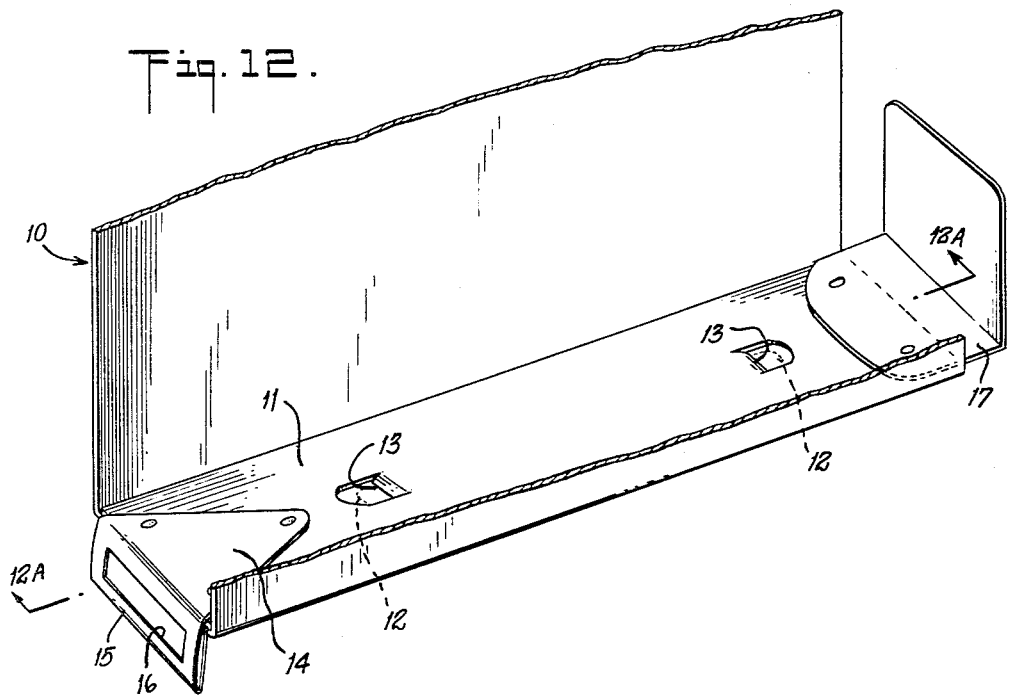
Figure 12 is a detailed perspective view of one of the suspension folders showing a reinforcing bottom wall and illustrating how the data tab is mounted on the file for front viewing and also illustrating the stop structure to prevent the files from being pushed too far into the folder.
Figure 12A:
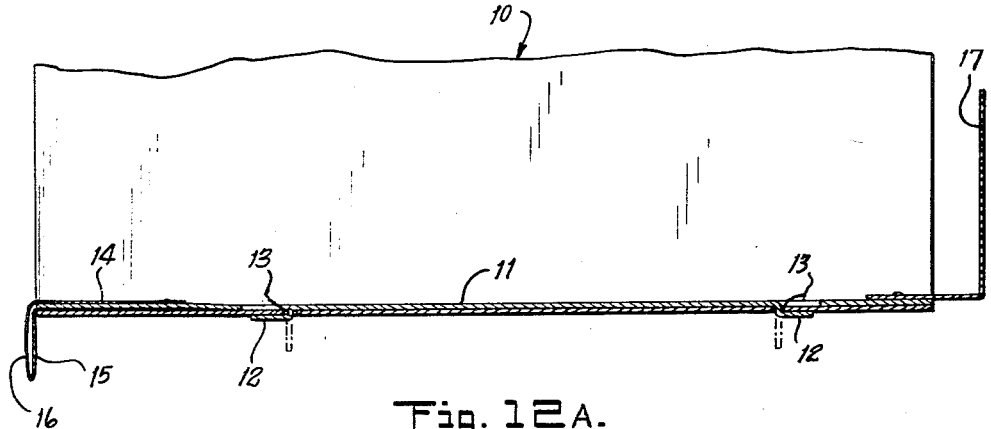
Figure 12A is a cross-sectional view taken on the line 12ª—12ª of Figure 12.

Figure 12 illustrates one form of structure for mounting the data tab 15. In this case the suspension file 10 is provided with a reinforcing strip 11 of metal, cardboard or the like, which is detachably mounted by means of struck-out tabs 12 which can be sprung into suitably spaced slits 13 in the bottom wall of the filing folder. As illustrated, the data tab 15 is a piece of suitably formed metal bent double on itself and along a medial transverse line, so that one end 14 can slip over the end of the reinforcing strip 11 and the other end under it, and be riveted or otherwise secured thereto as shown. It will be understood that the data tab structure 15 could be slipped onto the bottom wall of the full pocket without the use of the strip 11 and secured in place in a less expensive form of folder.

When desired and in addition to or in place of the back stop wall 6 each reinforcing strip 11 can be provided with a right angle extension 17, likewise secured to the strip 11 forming a back stop for the full contents. The position of the vertical wall of the back stop can be varied so as to lie in the plane of the rear edges of the pocket or at any desired spaced distance, as illustrated in Figure 12.

At this point it may be noted that the reinforcing strip 11 for the bottom wall of the pocket and attached fixtures forms no part of this invention by itself, but is the subject matter of a copending application of Frank D. Jonas, Serial No. 599,519, filed July 23, 1956, now abandoned. The main purpose of illustrating the structure of Figure 12 is to explain how a data tab 15 can be mounted in or attached to the filing pockets so as to be viewable from the front.

Figure 9:
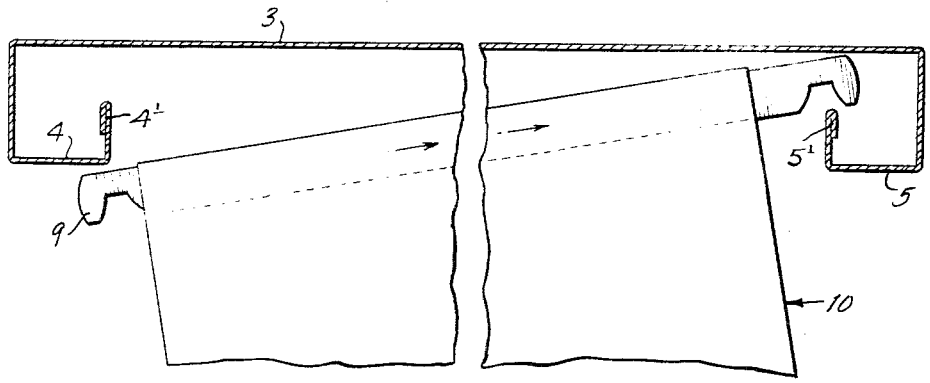
Figures 9, 10 and 11 are operational views, indicating the manner in which a suspension file can be mounted on the rails without the benefit of viewing the operation.
Figure 10:
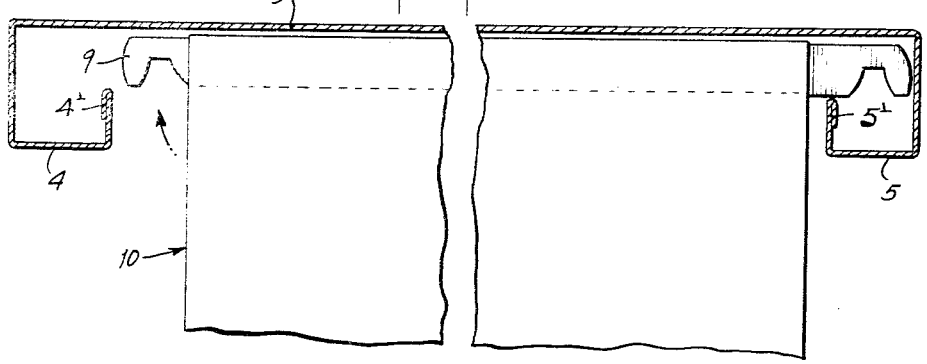
Figure 11:
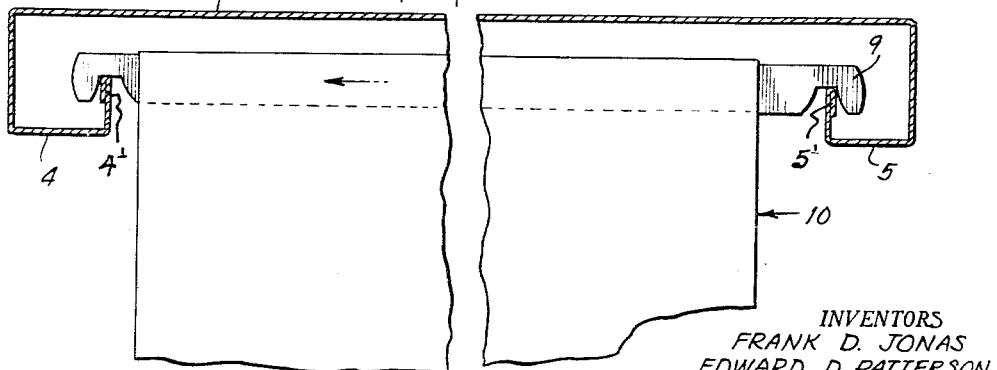

Figures 9, 10 and 11 illustrate how one may position a suspension file in the rack either below eye level or above it, without the necessity of viewing the operation. The filing folder 10 with its pair of suspension rods 9 is dipped to the position shown in Figure 9 and then pushed rearwardly to the position shown in Figure 10, until the front ends of the rods 9 can be raised above the rail on the front trough 4. The folder is then slid forward, as shown in Figure 11, until the front notches of the rods engage the front rail, at which time the rear notches of the rods engage the rear rail on trough 5. The operation is then completed.

In the manipulation of the files in normal use it is quite easy to cause the rods to take other than a right angle position with regard to the rails and if inadvertently lifted caused to drop off at one or both ends. In order to prevent this, as shown in Figures 5 and 6, it is a feature of this invention to provide the shelves 3ª with embossed downwardly projecting ribs 3ᵇ and 3ᶜ in groups front and back. As illustrated in these figures, these ribs are at right angles to the rails on the troughs 4ª and 5ª. To mount or dismount a file folder with this arrangement it is necessary that the suspension rods of the folders be at right angles to the ribs. The ribs are particularly shaped in cross-section and the filing folder can then be raised to a sufficient height for removal and replacement without interference from the ribs 3ᵇ and 3ᶜ. However, if the suspension rods are at an angle to the ribs they will contact them when they begin to move up under an inadvertent force. The parts are dimensioned, as is clear in Figure 5, so that under this condition the ribs stop the rods before their notches disengage the rails and hence the folders cannot be inadvertently displaced.

The same idea is present in the structure of Figures 7 and 8, in which case the ribs 3ᵇ and 3ᶜ are not at right angles to the rails but are at the small angle thereto, so that the suspension rods of the folders must be caused to assume a parallel relation before they can be raised high enough to be disengaged from the rails. In any but this special position inadvertent forces raising the folders will not be able to displace them because of the ribs. Figure 7 may be taken as an example to illustrate the correct positioning of the folders for removal whether the ribs be at right angles as in Figures 5 and 6, or at an angle as in Figure 8. When the rods are properly positioned they can be raised between the ribs to a point where they can be disengaged from the rails.

Figure 13:
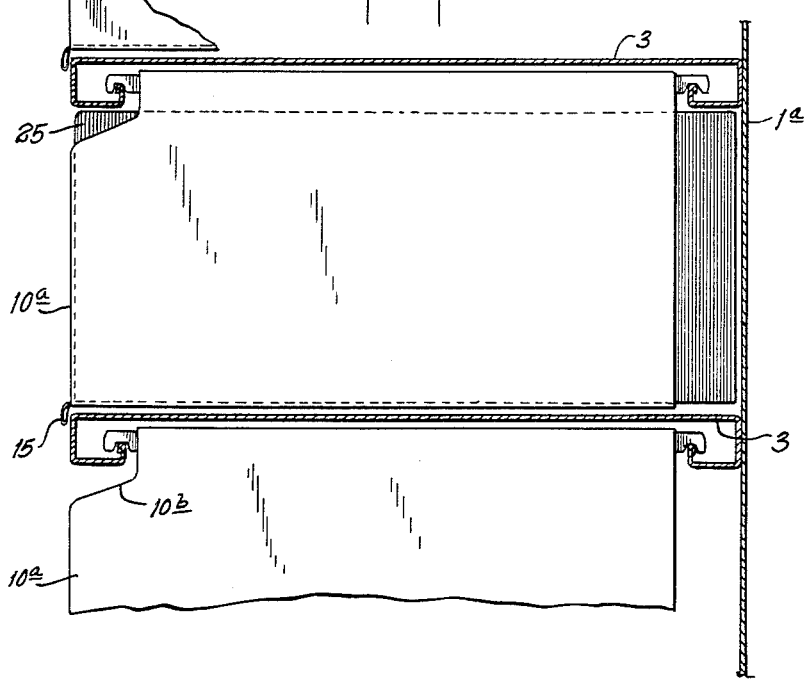
Figure 13 is a cross-sectional view similar to Figure 3, of a modified structure which differs from that of Figure 3 in that the front edges of the file suspension folders are flush with the front of the rack assembly.
Figure 14:
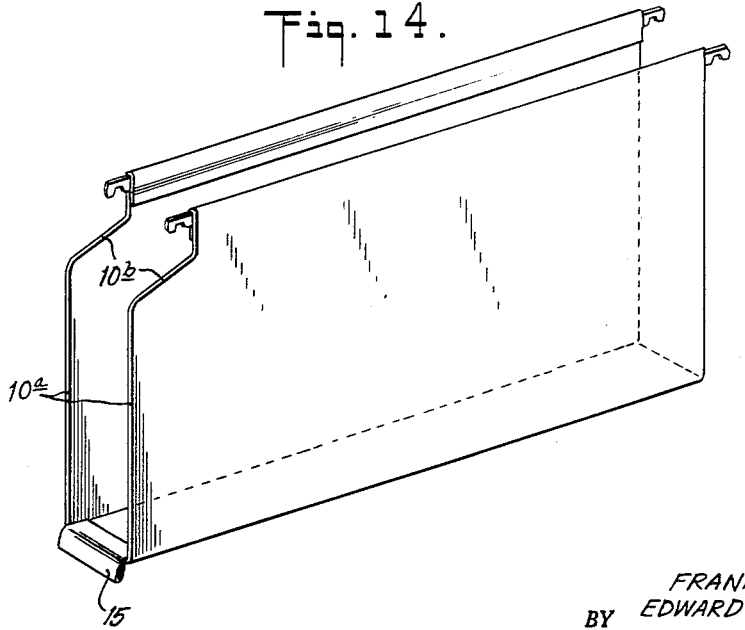
Figure 14 is a perspective view of the modified filing folder adapted for this purpose.

In retrospect it will be seen that in the structure thus far described, see for example Figure 3, the front edges of the filling folders 10 in mounted position are within the plane of the front edges of the frame partitions 1. This is a satisfactory structure where the data tabs 15 are parallel to that plane and can be read from the front of the assembly. In some cases, however, it is desirable to have the data tabs at or in front of the plane of the front wall of the assembly, in which case the structure of Figures 13 and 14 is suitable. The racks are the same as previously described but the filing folders 10ª have the side walls notched out at the front upper corner as at 10ᵇ, so that the front edges of the folders are in the plane of the front wall of the rack. With data tabs 15 like those previously described they can then be positioned to all lie in a plane substantially at the front wall of the rack, making it very easy to read them. The contents 25 of the folder can project to the rear thereof, as shown, to a point where they engage a rear wall 1ᵃ of the rack, or in the case of the structure of Figures 1 and 2, an angle piece like the piece 6 in the event that the back wall of the rack is not solid.

Figure 15:
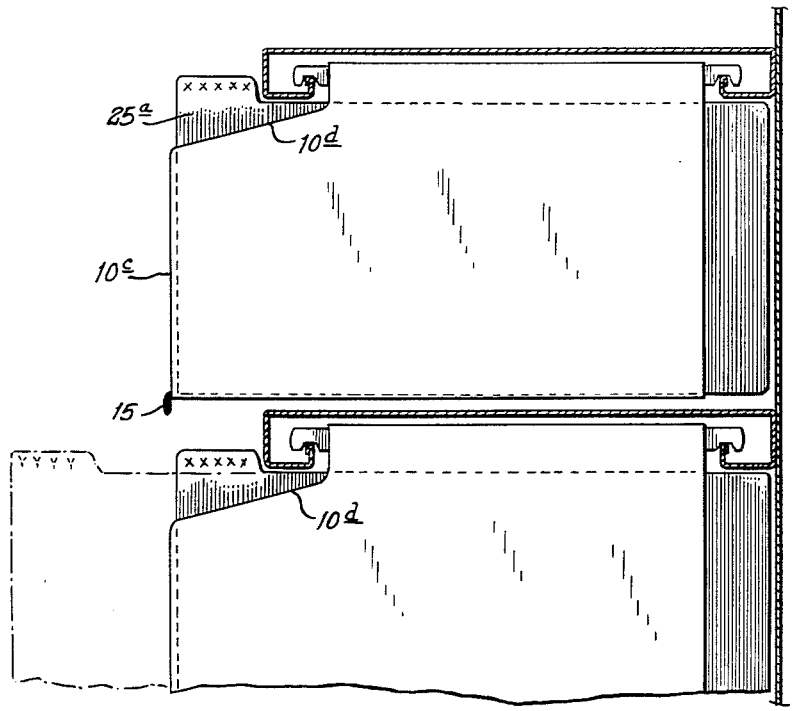
Figure 15 is a cross-sectional view similar to Figure 3, showing a construction in which the front edges of the filing folders project beyond the supporting rack structure.
Figure 16:
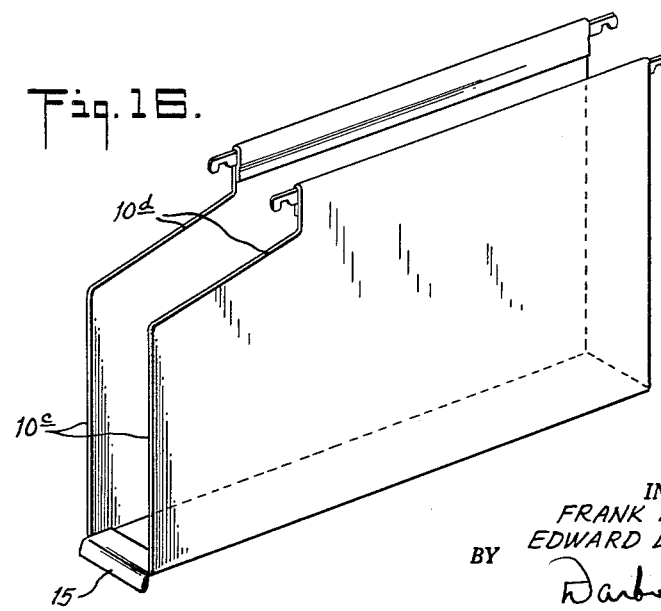
Figure 16 is a perspective view of the modified filing folder of this arrangement.

Figures 15 and 16 illustrate a further modification in which the folders 10ᶜ are shaped as by notching at 10ᵈ and dimensioned so that the front edges thereof project beyond the front wall of the rack. Thus in addition to exposing the parallel data tabs 15 an additional data sheet 25ᵃ can be supported in the folder and provided with a data tab, as shown, which can be read on a line of sight parallel to the front of the rack. Thus one walking along in front of a long rack of such files can readily see identifying data on these inserts.

The structure of Figures 17 and 18 is a combination of the suspension file of Figures 3 and 16. Thus the file 10 is the same as before but is provided with an inner slidable file 26 which is notched at 26ᵃ so that when it is withdrawn from fully inserted position (Figure 17, upper part to projected position Figure 17, lower part), it projects beyond the front face of the rack, making the contents of the folder more accessible. In this arrangement the front data tab 27 is mounted on the inner slidable pocket 26, so that it too moves forward for better inspection.

Figure 19:
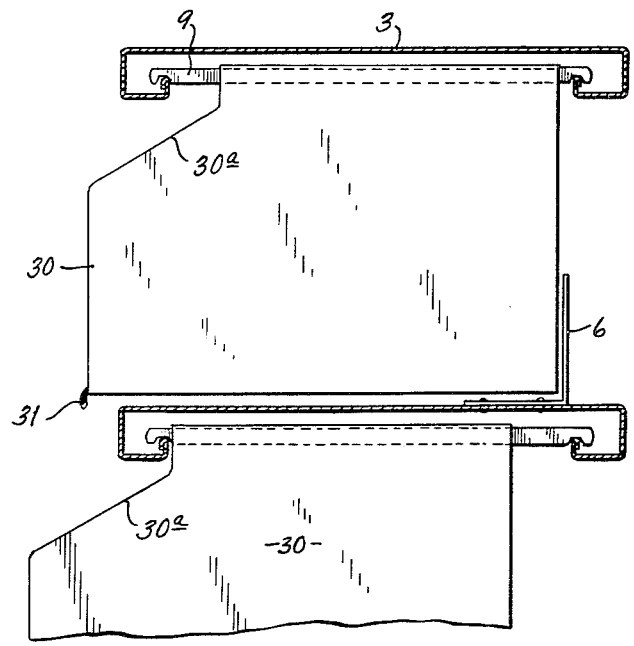
Figure 19 is a cross-sectional view similar to that of Figure 3, in which the modified feature of slidably supporting the filing folders on the suspension rails is illustrated.
Figure 20:
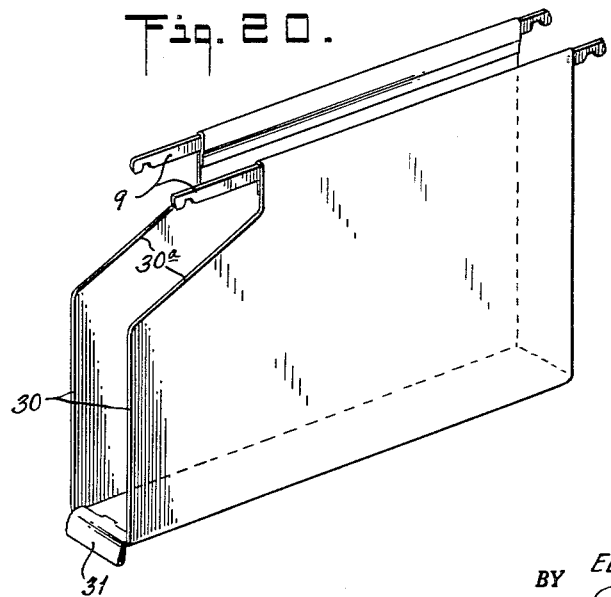
Figure 20 is a perspective view of this filing folder.

In the modification of Figures 19 and 20, the filing pockets 30 are notched, as at 30ᵃ, to reduce the length of the channels in which the rods 9 are mounted. With this arrangement, as is illustrated in the drawings, the pocket 30 can be slipped forwardly on the rods, from the position shown in the upper half of Figure 19 to the position shown in the bottom half. This again provides a smooth method of bringing the file contents forward for closer inspection. The file is provided with a front data tab 31, as previously mentioned. As the art well understands, these data tabs can be of transverse plastic requiring no cut-out to expose the data.

It will be apparent upon consideration that the structure of Figure 19 can be modified so that the front edges of the pockets are flush with the front of the rack when in normal position, or as shown, project beyond it. Some form of stop such as the angle plate 6 can be used to limit the rearward movement of the pocket on the rods 9.

There is an important feature in the above described construction which is well illustrated in Figure 13. As clearly shown in that figure, the parts are proportioned so that the index tabs 15 of one row of filing folders abut against the adjacent edge of the shelf just therebelow when the filing folders are pushed back into normal storage position in the rack. To state it another way, the lower shelf 3 provides an indexing surface for insuring a uniform neat arrangement of the index tabs for the filing folders suspended thereupon. This relationship is repeated throughout the entire vertical height of the rack, with the result that all of the index tabs 15 lie in a single plane, which plane is substantially in the front of the rack. This insures a neat appearing filing system and facilitates easy location of desired files as all of the tabs are easily visible from the front of the rack.

This same principle is found in the system of Figure 17 in which case, however, the index tabs 27 are indexed substantially into a single plane by the engagement of the rear edges of the filing folders 10 against the stop 6. In this case, however, it will be seen that the plane of the index tab 27 is not substantially in the front face of the rack, but is to the rear thereof.

The same idea is present in the arrangement of Figure 19, in which case, however, the index tabs 31 lie in a plane which is forward of the front face of the rack.

It is also emphasized that in the construction previously described the rails 4' and 5', for example, see Figure 10, are spaced and proportioned in cross-sectional size so that when the suspension rods 9 engage the rear wall of the troughs 5, the front ends of the suspension rods can just nicely pass by the inner wall of the troughs 4, so that they can be raised to the position shown in Figure 10 and then moved forwardly to final position shown in Figure 11.

Reference is now made to the modified structure of Figures 21 to 25, inclusive, wherein the main distinction is found in the fact that the rails are not part of a solid wall shelf, but comprise individual pairs of horizontal members which are tied in to the rack itself to also form strengthening members therefor. In this structure the rack consists of front and rear pairs of vertical angle irons 110 and 112 forming the corner posts for the rack sections. These angle irons 110 and 112 are secured together in pairs by a series of front and back extending angle iron braces 114, which are secured thereto by means of nuts and bolts. This provides front to back bracing for the frame. Extending longitudinally between the vertical angles are the front and back rail members 116 and 118 which are secured both to the vertical angles and to the horizontal braces by nuts and bolts. They are accurately positioned longitudinally by means of struck-out ears 116ᵃ and 118ᵃ, see for example Figures 24 and 25, which seat in slots 114ᵃ in the cross braces 114 and are secured in place by nuts and bolts which may go through the apertures formed by the struck-out ears. Thus the rail members perform both the function of supports for the suspension files and overall braces for the racks. In these figures the suspension folders are indicated at 130 provided with the suspension rods 9 as in previously described constructions. All the other variants with regard to the filing folders and inserts can be incorporated in this construction.

The spacing of the rails 116 and 118 and their proportioning in cross-section is such that the mounting of the suspension rods thereon may be accomplished as previously described by feel and without direct visual observation.

In this construction also, the index tabs 131 mounted on the folders are arranged to engage with the edge of the rail 116 and be aligned thereby. Thus the index tabs 131 serve the function of back stopping the folders and absorbing the rearward impacts and stresses involved in working with the files. By limiting such rearward movement these tabs tend to stabilize the folders when they are moved along the rails. Similar to the showing in Fig. 13 or Fig. 18, there is shown in Fig. 21 at 26, the contents of the folder which may be the material filed or a slidable pocket in which the material is filed. As in the previous cases, and as shown in Fig. 21, when the parts are properly positioned the contents 26 of the suspension folders 130, when fully inserted in the file folders, abut against the rear part of the rack or a component thereof. As a result of this and of the presence of the index tabs 31, the folders are held against a tendency to rotate on a horizontal axis under the weight of the contents. This comes about by the fact that the contents abut against the rear of the rack and the index tab abuts against the adjacent rail edge, preventing its tendency to turn. Under extreme loads if the front ends of the file folders do tip a bit, they are so closely spaced to the front rails 116 that they will move into contact with them preventing further tipping.

From the above description it will be apparent that the subject matter of this invention can be adapted to many specific forms, and it is intended, therefore, that those illustrated have been given as examples rather than limitations. It is preferred that the scope of protection afforded hereby be determined by the appended claims.

What is claimed is:

1. A filing system comprising a rack formed of upright frame members and interconnected horizontal members providing rail pairs, a plurality of suspension file folders each having a pair of rods suspended from said rails, and a data tab on each folder positioned for viewing from the front of said rack, and all said tabs engaging an adjacent horizontal member of said rack to align them substantially in a single plane.

2. In the combination of claim 1, said adjacent horizontal member comprising one of said rails.

3. In the combination of claim 1, said horizontal members having ribs positioned above the rails for preventing inadvertent displacement of said rods from said rails.

4. In the combination of claim 1, said horizontal members having ribs positioned above the rails for preventing inadvertent displacement of said rods from said rails, said ribs extending at an angle to said rails and being spaced from each other.

5. In the combination of claim 1, said horizontal member comprising shelves and having depending ribs formed therein above said rails.

6. In the combination of claim 1, said folders having complementarily shaped slidable inserts, index tabs on said inserts and said folders being notched to expose said tabs for reviewing on a line of sight parallel to the front plane of said rack.

7. In the combination of claim 1, said folders being folded about and slidably mounted on said rods so as to be slidable forwardly of the front plane of said rack.

8. In the combination of claim 1, said folders being formed with channels at the upper edges thereof in which said rods are slidably mounted and said folders being notched at one corner to permit substantial sliding movement of the folder on the rods.

9. In the combination of claim 1, said rails being spaced and proportioned so that when the ends of the suspension rods abut a wall of one rail the opposite ends of the rods can be moved past the other rail for mounting and demounting.

10. A filing system comprising a rack composed of a plurality of vertical frame members and a plurality of shelves interconnecting said frame members to make said rack form sustaining, parallel rail member pairs on the underside of each shelf, a plurality of pairs of suspension rods resting on said rail pairs, file pockets slidably mounted on said pairs of rods and means comprising data tabs for indexing said file pockets in a common plane when engaging adjacent shelves.

11. A filing system comprising a rack composed of a plurality of vertical frame members and a plurality of shelves interconnecting said frame members to make said rack form sustaining, parallel rail member pairs on the underside of each shelf, a plurality of file pockets each having a pair of suspension rods resting on said rail pairs, and spaced projections on the underside of each shelf spaced above its rail pairs to prevent inadvertent disengagement of the rods from the rails.

12. In the combination of claim 11, spaced projections on the underside of each shelf spaced above its rail pairs to prevent inadvertent disengagement of the rods from the rails, said projections extending parallel to each other and at a slight angle to said rails.

13. In the combination of claim 11, spaced projections on the underside of each shelf spaced above its rail pairs to prevent inadvertent disengagement of the rods from the rails, said projections extending parallel to each other and at a slight angle to said rails, and comprising formations integral with said shelf.

14. A combination as described comprising a framework having pairs of spaced parallel rails lying in vertically spaced planes, a plurality of file folders each including suspension rods having notched edges, the notches of said rods engaging said rails to align said rods longitudinally and data tabs secured on the front ends of said folders and engaging an adjacent rail to align said folders at their front edges in a single plane.

15. In the combination of claim 14, said file folders each comprising a pair of connected walls to form a V-shaped pocket, said walls being cut away to shorten their top edges, and said shortened top edges being folded and secured to form channels in which said rods lie.

16. A filing system comprising a rack composed of a plurality of vertical frame members and a plurality of shelves interconnecting said frame members to make said rack form sustaining, parallel rail member pairs on the underside of each shelf, a plurality of pairs of suspension rods resting on said rail pairs on which said file pockets can be slid forwardly of the front of said rack, and index tabs on said file pockets positioned to engage said rack so that said tabs and the front edges of said file pockets lie in a common plane.

References Cited in the file of this patent

FOREIGN PATENTS

| | | |
|---|---|---|
| 60,313 | France | Apr. 21, 1954 |
| | (First addition to Pat. 1,009,580) | |
| 281,150 | Switzerland | June 3, 1952 |
| 500,973 | Belgium | Feb. 15, 1951 |
| 967,011 | France | Mar. 15, 1950 |